United States Patent [19]
White

[11] Patent Number: 6,065,117
[45] Date of Patent: May 16, 2000

[54] SYSTEMS, METHODS AND COMPUTER PROGRAM PRODUCTS FOR SHARING STATE INFORMATION BETWEEN A STATELESS SERVER AND A STATEFUL CLIENT

[75] Inventor: John Gregg White, Cary, N.C.

[73] Assignee: International Business Machines Corporation, Armonk, N.Y.

[21] Appl. No.: 08/895,514

[22] Filed: Jul. 16, 1997

[51] Int. Cl.[7] ........................................................ H04L 9/00
[52] U.S. Cl. ........................ 713/159; 380/255; 380/259; 705/50; 705/64; 705/65; 713/150; 713/153; 713/155; 713/168; 713/172; 713/182; 713/185; 713/188; 713/189; 713/200; 713/201
[58] Field of Search .............................. 380/4, 9, 21, 23, 380/25, 49, 50, 59, 29, 30, 255, 259, 277, 278, 287; 395/186; 713/200, 150–153, 155, 159, 164, 168, 169, 170, 172, 182, 185, 188, 189, 201; 705/50, 51, 64–67

[56] References Cited

U.S. PATENT DOCUMENTS 5,138,712   8/1992   Corbin ..................................... 713/200

*Primary Examiner*—Bernarr E. Gregory
*Attorney, Agent, or Firm*—Myers, Bigel Sibley & Sajovec, P.A.; Jeanine S. Ray-Yarletts

[57] ABSTRACT

Systems, methods and computer program products for sharing state information between a stateless server and a stateful client are provided. A client request to perform an action on the server is accompanied by an encrypted token which contains state information. The server receiving the client request decrypts the token using a symmetric key generated from variable data. The server verifies that the received token is valid and uses the state information contained therein to perform the requested action. The server also provides clients with encrypted tokens using a symmetric key generated from variable data.

23 Claims, 3 Drawing Sheets

SYSTEMS, METHODS AND COMPUTER PROGRAM PRODUCTS FOR SHARING STATE INFORMATION BETWEEN A STATELESS SERVER AND A STATEFUL CLIENT

FIELD OF THE INVENTION

The present invention relates generally to computer network communications, and more particularly to client-server communications.

BACKGROUND OF THE INVENTION

In a client-server environment, a transaction based model is often used where a short-lived client request/server response occurs, and the server retains no state information about the client (referred to as a "stateless" server). Frequently, the client requires some context for subsequent transactions. In such cases, it is possible for state information to be stored by the client (referred to as a "stateful" client) and sent with subsequent requests to the server. Common examples of such a model are the Network File System (NFS) and Internet web clients/servers using the HTTP cookie extension to the HTTP protocol. A software token containing state information is exchanged between the client and server. It is typically created or set by the server when responding to a client request. The contents of the token are opaque to the client and interpretable only by the server. The client receives the token along with data in response to its request and will send the token back to the server on some subsequent request. Because of the asynchronous nature of such sequential transactions in a client-server environment, it is not known when or if the client will issue another request. Therefore, tokens typically have some expiration time or date after which the client will not send the token to the server, or the server will not accept the token, depending upon the particular client-server application.

In the case where the client decides whether the token has expired, token expiration information is not opaque to the client although token data is. This creates the potential for modification of the token expiration by a client. Even trusted client software can be made to continue to send a token which should have expired by modifying the client system clock when it is used in determining token expiration. The seriousness of such tampering depends upon the role of the token in the particular client-server application.

On most every client-server transaction between a stateless server and stateful client, a token is transmitted. The size of a token is usually a small percentage of the size of the data transferred on a given transaction. Token size should be minimized, however, because in high load environments where there are many clients frequently performing transactions with a single server, the system performance will improve when a small token is used.

SUMMARY OF THE INVENTION

In view of the above limitations it is one object of the present invention to provide tokens that are not susceptible to client modifications.

It is an additional object of the present invention to provide tokens of minimal size which are expired by the server even in client-server applications where the expiration is normally done by the client.

It is yet another object of the present invention to provide additional token validity tests.

These and other objects of the present invention are provided by methods, data processing systems and computer program products for retaining state information between a stateless server and a stateful client. As is known by those skilled in the art, a stateless server is not aware of previous transactions with clients. A stateful client is aware of previous transactions with a server. A client sends a request to a server to perform some action. Upon receiving the request, the server performs the requested action and creates a token containing state information about the completed transaction. The server encrypts the token and returns it and the output of the transaction to the client. The server encrypts the token by selecting a variable seed value used in the creation of the symmetric encryption/decryption key. The seed value corresponds to an expiration time/date or to some unique value which restricts the use of the token in some way.

On a subsequent request to the server, the client returns the encrypted token or a copy of the encrypted token, depending on the particular client-server application, containing state information in addition to its request to perform some action. In response to the request, the server decrypts the token by selecting a variable seed value used in the creation of the symmetric encryption/decryption key and decrypts the token. It then uses the state information obtained from the decrypted token to perform the requested action. Depending upon the particular client-server application, the server will repeat the process of saving and encrypting state information and returning it with the output of the action, or it will return the output of the action because the state information in the token held by the client does not require modification for subsequent transactions. This process repeats until the value of the variable seed changes between an encrypted response and subsequent decrypted reply. Because the variable seed has changed, the generated symmetric key differs in decryption from the one used in encryption, and the decrypted token data will not correspond to a valid server state. The requested action will not be performed and the token is effectively expired. In the case where the seed value corresponds to some unique value that restricts access and not to an expiration time/date, the token will remain invalid until the environment which caused the original variable seed value to be selected is restored.

The present invention is advantageous because minimally sized tokens which are secure from client modification are used for maintaining state between client and server. Token expiration is always performed on the server side thus eliminating the vulnerabilities of the client side system clock. The present invention provides temporary or permanent token invalidation based on any property or properties known to the server which can be uniquely mapped to a variable seed value that is used for symmetric key generation.

DETAILED DESCRIPTION OF THE INVENTION

Figure 1:
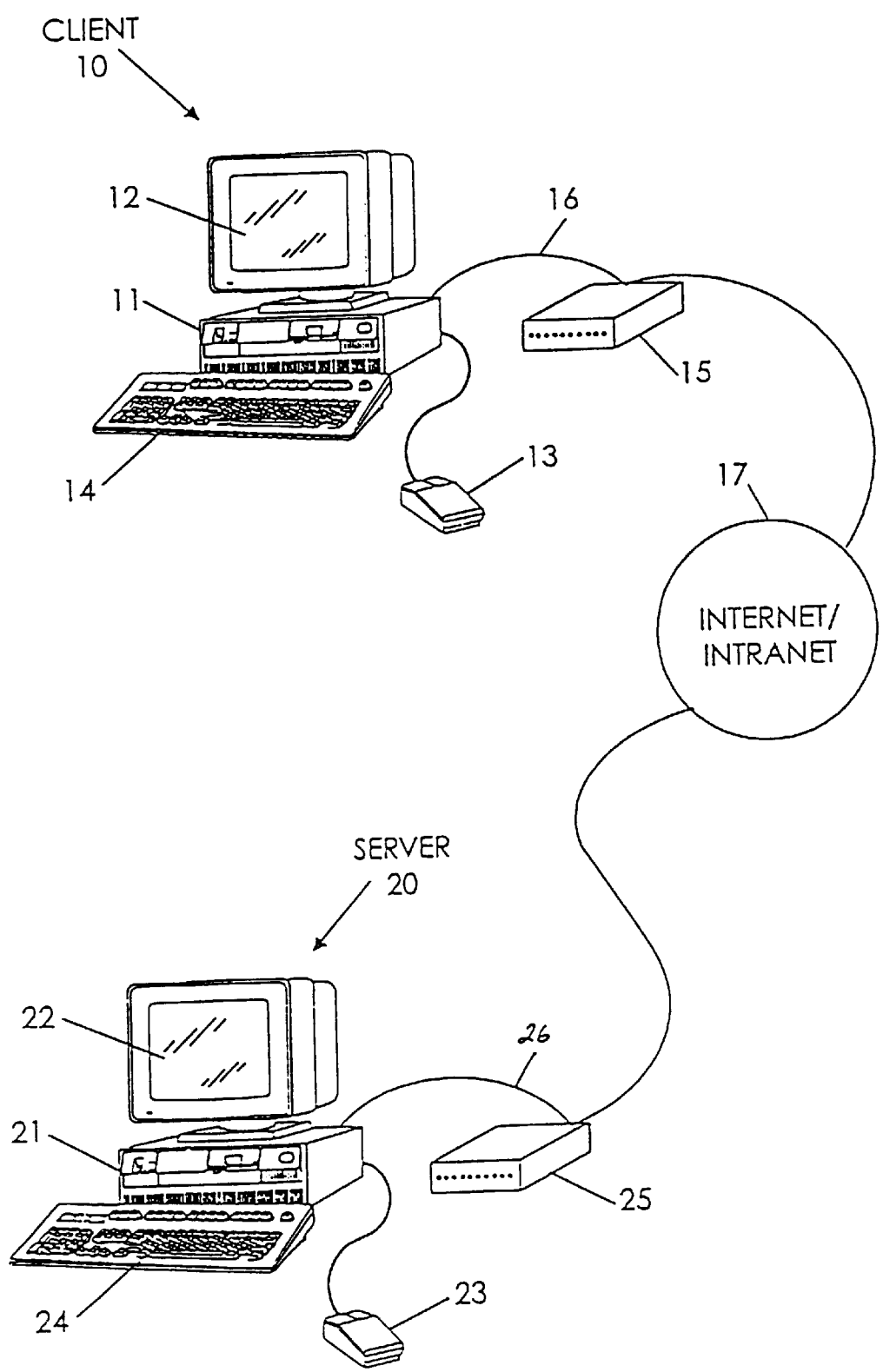
FIG. 1 schematically illustrates a client and server in communication via a computer network.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The present invention will now be described more fully hereinafter with reference to the accompanying drawings, in which preferred embodiments of the invention are shown. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Client-server Communications

As is known to those with skill in the art, client-server environments may include public networks, such as the Internet, and private networks often referred to as "Intranets." Hereinafter, the term "Internet" shall incorporate the term "Intranet" and any references to accessing the Internet shall be understood to mean accessing an Intranet as well. Hereinafter, the term "computer network" shall incorporate publicly accessible computer networks and private computer networks.

Exemplary client-server communications are schematically illustrated in FIG. 1. However, it is to be understood that the present invention may be used with all client-server communications, and is not limited to communications between a web server and a web client. Users may access the Internet via a computer or terminal referred to as a client 10. Exemplary clients 10 may include, but are not limited to, an Apple®, Sun Microsystems®, IBM®, or IBM-compatible personal computer. A client 10 preferably includes a central processing unit 11, a display 12, a pointing device 13, a keyboard 14, access to persistent data storage, and an Internet connection 16 for connecting to the Internet 17. The keyboard 14, having a plurality of keys thereon, is in communication with the central processing unit 11. A pointing device 13, such as a mouse, is also connected to the central processing unit 11. The Internet connection 16 may be made via a modem 15 connected to traditional phone lines, an ISDN link, a T1 link, a T3 link, via cable television, via an ethernet network, and the like. The Internet connection 16 may be made via a third party, such as an "Internet Service Provider" ("ISP"). The Internet connection 16 may be made either by a direct connection of the client 10 to the Internet or indirectly via another device connected to the Internet. In the latter case, the client 10 is typically connected to this device via a local or wide area network (LAN or WAN). Preferably, data transfer rates between a client 10 and a server are equal to, or greater than, fourteen thousand four hundred baud (14,400 baud). However, lower data transfer rates are sometimes encountered.

The central processing unit 11 contains one or more microprocessors (not shown) or other computational devices and memory (36, FIG. 3) or its functional equivalent for storing programs therein for processing by the microprocessor(s) (38, FIG. 3) or other computational devices. A portion of the random access memory and/or persistent data storage, referred to as "cache," is often utilized during communications between a client 10 and a server (described in detail below) to store various data transferred from the server.

Preferably, a client 10 has an Intel® 80386 processor (or equivalent) with at least eight megabytes (8 MB) of RAM, and at least five megabytes (5 MB) of persistent computer storage 15 for caching. Even more preferable is an Intel® 80486 or Pentium® processor (or equivalent). However, it is to be understood that various processors may be utilized to carry out the present invention without being limited to those enumerated herein. Although a color display is preferable, a black and white display or standard broadcast or cable television monitor may be used. A client 10, if an IBM®, or IBM-compatible personal computer, preferably utilizes either a Windows®3.1, Windows 95®, Windows NT®, Unix®, or OS/2® operating system. However, it is to be understood that a terminal not having computational capability, such as an IBM® 3270 terminal or a network computer (NC), or having limited computational capability, such as a network PC (Net PC) may be utilized in accordance with an embodiment of the present invention for accessing the Internet in a client capacity.

In a web environment, a user accesses a server by establishing a TCP connection between the client 10 and server 20. For the majority of Internet communications, a client communicates with a server using HTTP protocol over a TCP connection between the client and server. The data transferred between the client and the server are HTTP data objects (e.g. HTML data). A server may be a proxy that receives requests from a number of clients and routes the requests to the appropriate server. A server may also be referred to as an HTTP server.

A server 20 may have a configuration similar to that of a client 10 and may include a central processing unit 21, a display 22, a pointing device 23, a keyboard 24, access to persistent data storage 25, and an Internet connection 26 for connecting to the Internet 17 via a modem 25, or otherwise. It is preferable that a server have an Intel® Pentium® processor or equivalent, at least sixteen megabytes (16 MB) of memory (36, FIG. 3) or its functional equivalent for storing programs therein for processing by the microprocessor (38, FIG. 3) or other computational devices, and at least eight hundred megabytes (800 MB) of data storage. However, a server 20 may be implemented using other processors and via other computing devices, including, but not limited to, mainframe computing systems and minicomputers. Server software handles requests from clients for documents, whether they are text, graphic, multimedia, or virtual. The server software may run under the operating system of the server.

It is understood that a client or server or other apparatus configured to execute program code embodied within computer usable media, operates as means for performing the various functions and carries out the methods of the various operations of the present invention. It is also understood that the present invention may be used with all client-server communications, and is not limited to specific protocols such as TCP/IP protocol.

Figure 3:
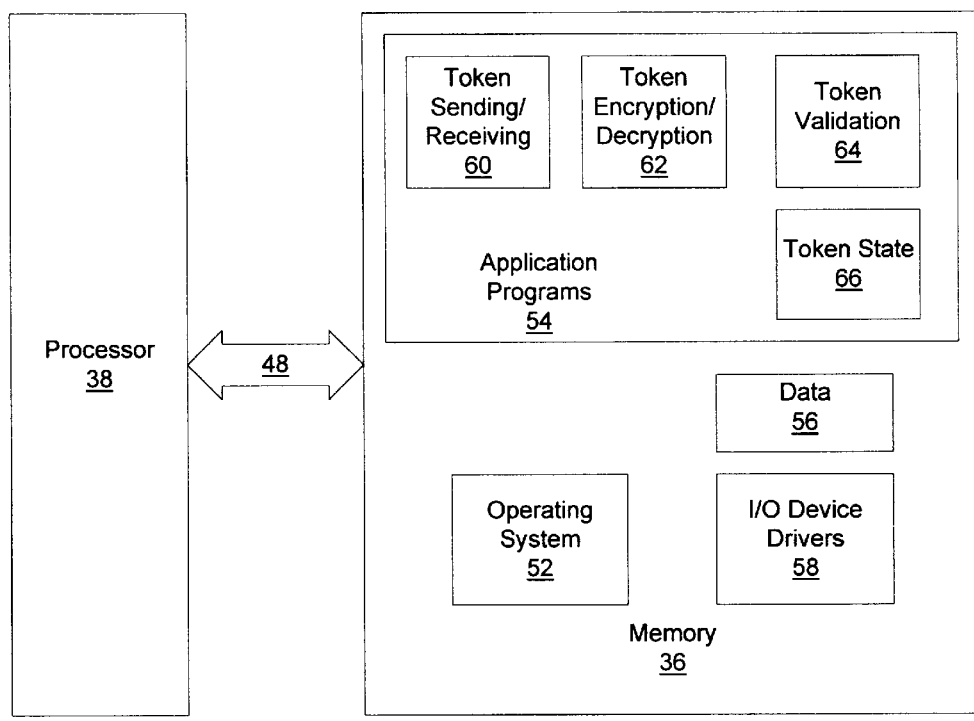
FIG. 3. is a detailed view of a data processing system suitable for use with the present invention.

FIG. 3 is a more detailed block diagram of a data processing (i.e., computer) system 30, such as a client (10, FIG. 1) and server (20, FIG. 1), for carrying out the present invention. As would be understood by one of skill in the art, the processor 38 communicates with the memory 36 via an address/data bus 48. The processor 38 can be any commercially available or custom microprocessor or other processing system capable of carrying out the operations of the present invention. The memory 36 is representative of the overall hierarchy of well known memory devices containing the software and data used to implement the functionality of the computer system 30. The memory 36 can include, but is not limited to, the following types of devices: cache, ROM, PROM, EPROM, EEPROM, flash, SRAM, and DRAM.

As would be understood by one of skill in the art, the memory 36 may hold software and data used in the computer system 30 including an operating system 52, application programs 54, input/output (I/O) device drivers 58, and data 56. The application programs 54 comprise the programs that serve as means for performing the various operations of the present invention and preferably include at least one application module or object for token sending and receiving 60, token encryption and decryption 62, token validation 64, and token state 66, which carry out the operations of the present invention as described below.

Token Encryption

Figure 2:
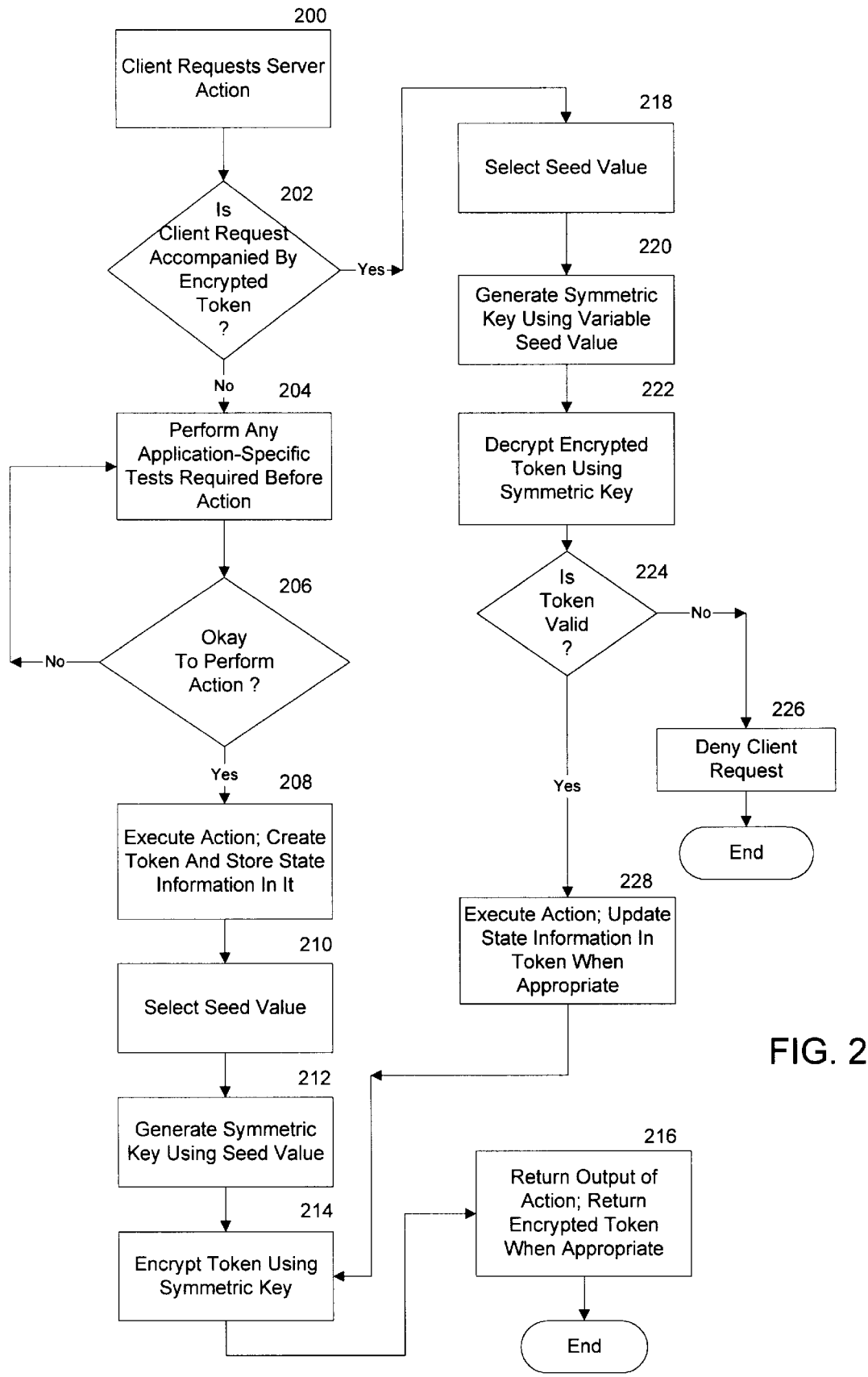
FIG. 2 is a flowchart schematically illustrating operations for various aspects of the present invention.

Referring now to FIG. 2, operations for executing stateful client requests on a stateless server using an encrypted token containing state information are schematically illustrated. When a client requests an action to be performed by the server (Block 200), a determination is made whether the request is accompanied by an encrypted token (Block 202). If the client request is not accompanied by an encrypted token, the server may perform any necessary steps required before execution of the action can occur. These steps are specific to the particular client-server application and may be as simple as assuming some default values for state before performing the action or as complex as initiating an authentication sequence through dialog with the client (Block 204). When the outcome of these steps allows execution of the action (Block 206), the action is performed, a token is created, and the state of the server after execution is stored in the token (Block 208).

Once a token with data exists (Block 208), a seed value is selected (Block 210). A seed is some numeric value in a range of allowable input values to a pseudo random number generator used for symmetric key generation. The seed is selected by uniquely mapping some dynamic value or values into its range. Examples include, but are not limited to, time of day, day of the week, day of the month, day of the year, and the like. Other possible values that may be used for seed generation which are not time based include, but are not limited to, client network addresses, subnet addresses, client software version information, and user information. The function which maps these values to a seed value must be one to one so that any combination of values uniquely corresponds to a seed value. For example, in the simple case of using the day of the year to select the seed value, the numeric value for the day in the range [1,365] can be used as the seed value since it uniquely maps to a value in the seed range.

Whenever the value of one of these dynamic variables changes, a different seed and therefore a different symmetric key is generated. This is how server side token expiration is achieved and other interesting token properties can be imparted to the client-server application. In the case of an HTTP (web) client and server, it is possible for the server to know information about the client. If the brand of browser is mapped to a unique seed value, then a token created and encrypted on an initial request from a Netscape browser cannot be reused by some non-Netscape browser because it will generate a different seed value and different symmetric key. Another example is an NFS server using the IP address of the NFS client to generate a seed value and symmetric key. If that client's IP address changes, then its previously encrypted token will no longer be valid because the server will use a different symmetric key based on the seed value derived from the new IP address for decryption.

Still referring to FIG. 2, once a seed value is selected (Block 210), a symmetric key is generated by supplying the seed to the pseudo random number generator which is used in key generation (Block 212). As is known to those with skill in the art, a symmetric key is a key that can be used for both encryption and decryption. According to the present invention, the server receiving the client request performs both encryption and decryption of the token. Once a symmetric key is generated (Block 212), the token containing the state information (Block 208) is encrypted using the generated key (Block 214). The encrypted token is returned to the client along with the output of the requested action (Block 216).

If a client is accompanied by an encrypted token (Block 202), a seed value is selected using the predefined variable seed generation values and mapping function (Block 218). Once a seed value is selected, a symmetric key is generated by the server (Block 220). The generated symmetric key is then used to decrypt the received encrypted token (Block 222).

Once the received token is decrypted, a determination is made if the token is valid (Block 224) by examining the state information. A forged token could not be decrypted correctly and would have invalid state information. Similarly, the token may contain valid state information, but when the symmetric key used to encrypt the token differs from the key used to decrypt it, then the state information will not appear valid. For example, in the case where the day of the year is used to select the seed value for symmetric key generation, when the day of the year changes on the server system at midnight, any previously encrypted tokens will no longer be valid because the symmetric key generated using the new seed value will be different from the one used to encrypt it. If the state information is not valid or appears invalid because of a changed decryption key, then the requested action is not performed by the server and some appropriate response is provided to the client indicating the failure condition (Block 226).

Subsequent operations depend upon the particular client-server application and may be as simple as the client sending a request without an accompanying token or as complex as requiring the execution of a series of steps to identify and authorize the client to additional transactions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of providing state information between a stateless server and a stateful client, said method comprising the steps of:

receiving a client request to perform a server action;

responsive to receiving the client request, performing the action and creating a token containing post-action state information;

encrypting the created token; and sending the encrypted token and action output to the client.

2. A method according to claim 1, further comprising the steps of:

receiving from the client the encrypted token with a subsequent client request to perform a server action; and responsive to receiving the subsequent client request, decrypting the received encrypted token; and responsive to decrypting the received encrypted token, verifying that the received token is valid.

3. A method according to claim 2, wherein the step of decrypting a received encrypted token comprises the steps of:

selecting a second value of the first variable seed;

generating a second symmetric key using the selected seed second value; and decrypting the received encrypted token using the second symmetric key.

4. A method according to claim 3, wherein the step of generating a second symmetric key comprises using the selected variable seed second value as input to a pseudo-random number generator used by a symmetric encryption routine to generate the second symmetric key.

5. A method according to claim 1, wherein said step of encrypting the token comprises the steps of:

selecting a first value of a first variable seed;

generating a first symmetric key using the selected seed first value; and encrypting the token using the first symmetric key.

6. A method according to claim 5, wherein the step of generating a first symmetric key comprises using the selected variable seed first value as input to a pseudorandom number generator used by a symmetric encryption routine to generate the first symmetric key.

7. A method according to claim 5, wherein the step of generating a first symmetric key comprises generating the selected variable seed first value from a plurality of variable inputs.

8. A method of providing state information between a stateless server and a stateful client, said method comprising the steps of:

sending a client request to perform a server action; and receiving from the server an encrypted token.

9. A method according to claim 8, further comprising sending the encrypted token with a subsequent client request to perform a server action.

10. A method of providing state information between a stateless server and a stateful client, said method comprising the steps of:

sending an encrypted token with a client request to perform a server action;

receiving the encrypted token with the client request to perform a server action from the client;

responsive to receiving the client request, decrypting the received encrypted token;

responsive to decrypting the received encrypted authentication token, verifying that the received token is valid;

responsive to verifying that the received token is valid, using state information contained therein to perform the requested action;

responsive to performing the requested action, replacing previous state information with new state information in the token;

encrypting the token; and sending encrypted token and action output to the client.

11. A method according to claim 10, wherein the step of decrypting a received encrypted token comprises the steps of:

selecting a variable seed value;

generating a symmetric key using the selected variable seed value; and decrypting the received encrypted token using the symmetric key.

12. A method according to claim 11, wherein the step of encrypting a received token comprises the steps of:

using the symmetric key generated key generated during decryption; and encrypting the decrypted token with updated state information using the symmetric key.

13. A data processing system for providing state information between a stateless server and a stateful client, said data processing system comprising:

means for receiving a client request to perform a server action;

means, responsive to said client request receiving means, for performing the action and creating a token containing post-action state information;

means for encrypting the created token; and means, responsive to said encrypting means, for sending the encrypted token and action output to the client.

14. A data processing system according to claim 13, further comprising:

means for receiving from the client the encrypted token with a subsequent client request to perform a server action; and means, responsive to said means for receiving the subsequent client request, for decrypting the received encrypted token; and means, responsive to said decrypting means, for verifying that the received token is valid.

15. A data processing system according to claim 14, wherein said means for decrypting a received encrypted token comprises:

means for selecting a second value of the first variable seed;

means, responsive to said selecting means, for generating a second symmetric key using the selected seed second value; and means, responsive to said generating means, for decrypting the received encrypted token using the second symmetric key.

16. A data processing system according to claim 15, wherein said means for generating a second symmetric key comprises means for using the selected variable seed second value as input to a pseudorandom number generator used by a symmetric encryption routine to generate the second symmetric key.

17. A data processing system according to claim 13, wherein said means for encrypting the token comprises:

means for selecting a first value of a first seed;

means, responsive to said selecting means, for generating a first symmetric key using the selected seed first value; and means, responsive to said generating means, for encrypting the token using the first symmetric key.

18. A data processing system according to claim 17, wherein said means for generating a first symmetric key comprises means for using the selected variable seed first value as input to a pseudorandom number generator used by a symmetric encryption routine to generate the first symmetric key.

19. A data processing system according to claim 17, wherein said means for generating a first symmetric key comprises means for generating the selected variable first seed value from a plurality of variable inputs.

20. A data processing system for providing state information between a stateless server and a stateful client, said data processing system comprising:

means for sending an encrypted token with a client request to perform a server action;

means for receiving the encrypted token with the client request to perform a server action from the client;

means, responsive to said means for receiving the client request, for decrypting the received encrypted token;

means, responsive to said decrypting means, for verifying that the received token is valid;

means, responsive to said verifying means, for using state information contained therein to perform the requested action;

means, responsive to said performing means, for replacing previous state information with new state information in the token;

means for encrypting the token; and means for sending the encrypted token and action output to the client.

21. A data processing system according to claim 20, wherein said means for decrypting a received encrypted token comprises:

means for selecting a variable seed value;

means for generating a symmetric key using the selected variable seed value; and means for decrypting the received encrypted token using the symmetric key.

22. A computer program product for providing state information between a stateless server and a stateful client, said computer program product comprising:

a computer usable medium having computer readable program code means embodied in said medium for receiving a client request to perform a server action;

the computer usable medium having computer readable program code means embodied in said medium, responsive to said client request receiving means, for performing the action and creating a token containing post-action state information;

the computer usable medium having computer readable program code means embodied in said medium for encrypting the created token; and the computer usable medium having computer readable program code means embodied in said medium, responsive to said encrypting means, for sending the encrypted token and action output to the client.

23. A computer program product according to claim 22, further comprising:

computer readable program code means embodied in said medium for receiving from the client the encrypted token with a subsequent client request to perform a server action;

computer readable program code means embodied in said medium, responsive to said means for receiving the subsequent client request, for decrypting the received encrypted token; and computer readable program code means embodied in said medium, responsive to said decrypting means, for verifying that the received token is valid.

* * * * *